2. Sheets. Sheet 1.

WM C. KING

Imp. in Machines for Operating Glass Molds.

No. 4,571. Reissued Sep. 26 1871.

Witnesses.
R. C. Wrenshall
James F. Kay

Inventor.
William C. King
by his attorneys
Baldwell Tinty Kerr

2 Sheets Sheet 2.
WM. C. KING.
Imp. in Machines for Operating Glass Molds.
No. 4,571
Reissued Sep. 26, 1871.
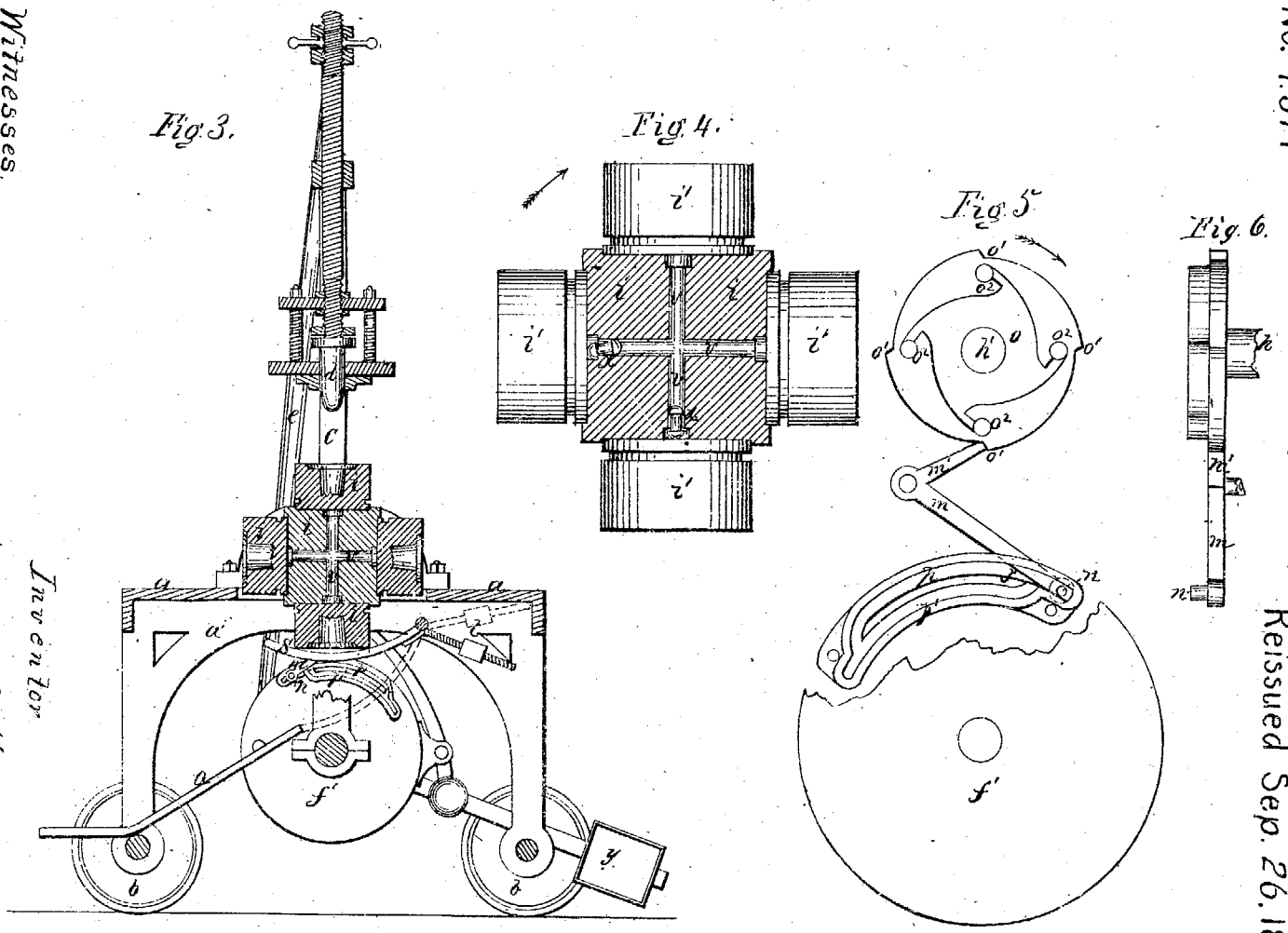
Witnesses.
R. C. Trenwally
James D. Kay.
Inventor
William C. King
by his attorneys
Bedwell, Litty & Kerr

UNITED STATES PATENT OFFICE.

WILLIAM C. KING, OF PITTSBURG, PENNSYLVANIA.

IMPROVEMENT IN MACHINES FOR OPERATING GLASS-MOLDS.

Specification forming part of Letters Patent No. 114,569, dated May 9 1871; reissue No. 4,571, dated September 26, 1871.

*To all whom it may concern:*

Be it known that I, WILLIAM C. KING, of Pittsburg, in the county of Allegheny and State of Pennsylvania, have invented a new and useful improvement in Machine for Operating Glass-Molds; and I do hereby declare the following to be a full, clear, and exact description thereof, reference being had to the accompanying drawing making a part of this specification, in which—

Figure 2:
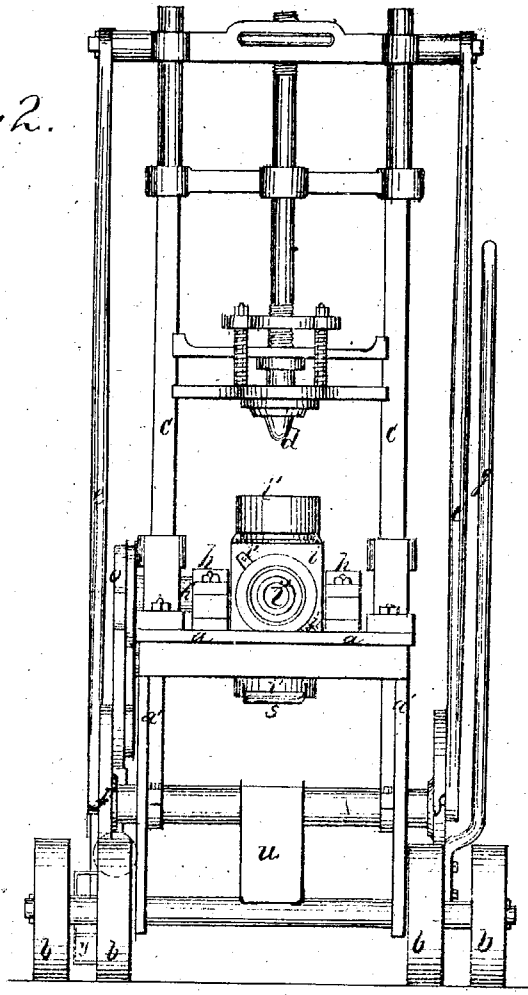
Figure 1:
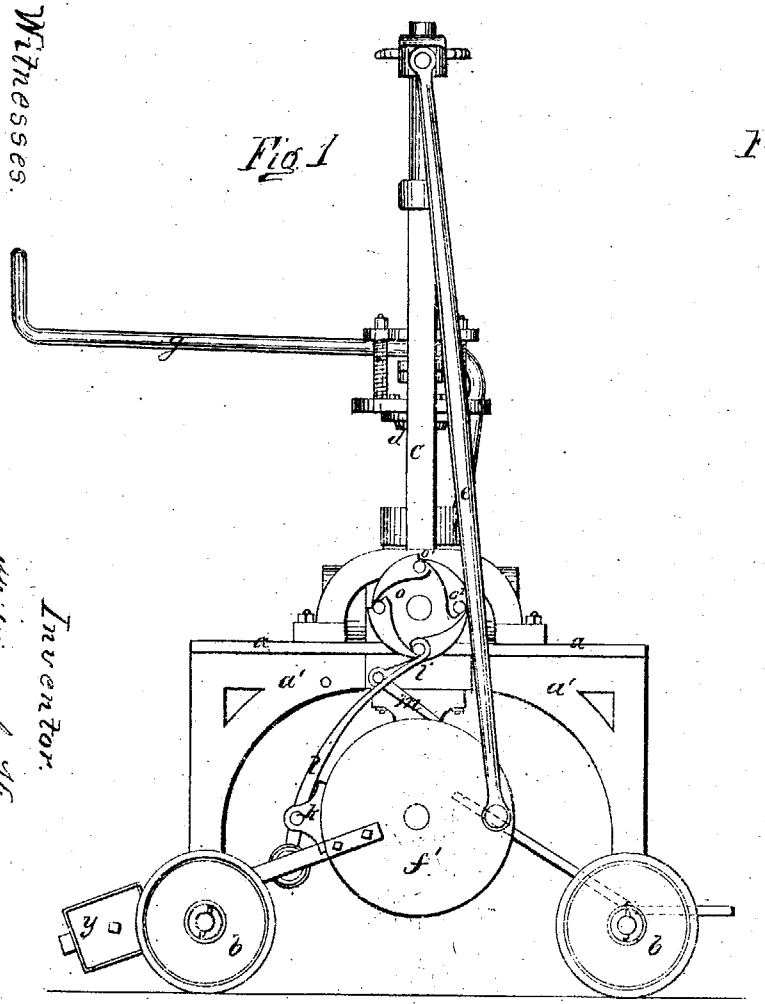

Figure 1 is a side elevation of my improved machine for operating molds for pressing glass-ware. Fig. 2 is a front elevation of the same. Fig. 3 is a vertical longitudinal section thereof. Fig. 4 is a side view of the molds, partly in section. Fig. 5 is a detached view of the devices for holding the mold in position for the descent of the plunger. Fig. 6 is an edge view thereof.

Like letters of reference indicate like parts in each.

The nature of my invention consists in a rotating base for carrying consecutively, through the medium of suitable operating gear, a number of glass molds into such position that the plunger shall descend therein and form an article of glass-ware, which is, after it is formed, delivered from the molds by means of appropriate mechanism.

To enable others skilled in the art to make and use my invention, I will describe its construction and mode of operation.

I make a press of the ordinary construction, having a bed-plate, *a*, and frame *a'* mounted upon wheels *b*, uprights *c c*, plunger *d*, connecting-rods *e e*, wheels *f f'*, and counterpoise-lever *g*, as are common in such presses; but with an opening in the center of the bed-plate *a*, in which is hung, by journals in the bearings *h h*, a revolving rectangular mold-block, *i*, carrying a glass-mold, *i'*, of the ordinary construction upon each of its four outer faces. The molds *i'* are attached to the block *i* by the bolts *i''*, and are easily removable.

The devices for operating the revolving mold-block *i* in connection with the plunger *d* are as follows: One end of the axle *h'* is extended out beyond the bed-plate on one side, so as to support and carry the wheel *o*, around the circumference of which are ratchet-teeth *o'*, and projecting from the outer side or face of which, near the edge, are several pins *o o*, at regular distances apart. Loosely riveted to the lug *k*, on the circumference of the wheel *f'*, is a lever, *l*, weighted at its lower end and having a hook, *l*, on its upper end. This hook *l* is so placed in reference to the pins *o''* on the wheel *o* that when the lever *g* is drawn down to operate the plunger *d* the forward motion of the wheel *f'* carries the hook forward beyond the wheel *o*. When the lever *g* is thrown back and the motion of the wheel *f'* reversed the weighted end of the lever *l* causes the hook *l'* to catch or hook into one of the pins *o''*, and, being carried back by the revolution of the wheel *f'*, it causes the wheel *o* to make a partial revolution. The wheel *o* being rigidly attached to the axle *h'*, by its revolution causes the revolution of the mold-block *i'*. The downward stroke of the lever *g* causes the plunger *d* to descend in a mold, *i*, and throws the hook *l'* forward, as described, while the upward or backward throw raises or withdraws the plunger and causes the hook *l'* to catch on the pin *o''* and turn the mold-block just the distance necessary to bring the next mold into position. To prevent the mold from turning past its position I lock it at that point by means of the bent lever *m*, which is pivoted to the side of the table in such position that when the short arm is thrown up it comes against the teeth *o'* of the wheel *o* and prevents its turning. The end of the long arm has a pin, *n*, which works in a groove on the inner face of the wheel *f'*. This groove is of two parts, an outer one, *p*, which runs along near the end of the wheel and at its back end runs down into an inner groove, *p'*, which runs forward along the inside of the other and at its forward end runs up into it, making a continuous but irregular circuit. When the lever *g* is making its downward stroke, the pin *n* slides along back in the groove *p*. This holds the end of the short arm *m'* against the teeth *o'* and prevents the wheel from turning. Near the end of the stroke the pin *n* runs down into the lower groove *p'* and releases the wheel *o*. During the backward throw of the lever *g*, and while the wheel *o* is being turned a quarter way around, the pin *m* slides forward along its groove *p'* and near the end slips up into the upper groove, once more locking the wheel *o*, which operation is repeated every time the lever is operated. The pin is prevented from falling into the lower groove at the forward end by the drop *r*, which, after the pin *n* has passed up, covers the opening, so that on the return-stroke the pin passes over it.

The operation of my machine is as follows: The molds $i'$ are heated to the proper degree and secured to the block $i$. The molten glass is dropped into the upper mold, cut off, and the plunger made to descend therein by drawing down the lever $g$, and the glass thereby pressed into shape and the piece of ware formed. The lever is then thrown back, which motion causes the plunger to rise and the mold-board $i$ to be rotated one-quarter way around by means of the hook $l'$ and wheel $o$. This brings the next mold into position, and the operation is repeated. When the mold carrying an article of glass-ware reaches the lowest point its position is reversed and the article drops out into a pan, $s$, which is balanced by an adjustable weight, $t$. The article tips or depresses the pan, as shown by dotted lines, Fig. 3, so that the article slides off onto and down the incline $u$, from whence it is taken to the leer or annealing-oven. For fear the article pressed should stick in the mold, I have made two small chambers, $v$, running through the block to the bottoms of the opposite molds, and with enlarged ends, in each of which I have placed a drop-weight, $x$, having a small shoulder around each end. The weight being at the lower end of the chamber $e$ when an article is being pressed, is carried around to the other or upper end when the article reaches the discharging-point. From this point, being no longer supported by its shoulder, it falls to the lower end, strikes against the bottom of the mold, and by jar loosens the article therefrom, if it has not already dropped out. I do not limit myself to the number of molds shown, but use any practicable number in connection with the revolving block.

By the method at present in general use, in which one mold (or two molds, each alternately) is slipped by hand beneath the plunger on a solid bed-plate and drawn forward and tipped over by means of a handle fastened to the mold, a considerable portion of the time and labor required to press an article is taken up in handling the mold, in allowing the article to become stiff or firm enough to be emptied, and giving the mold time to cool sufficiently to work with well. By the arrangement above described the time occupied or necessary for the above purpose is afforded without delaying the operation of pressing, so that the presser can accomplish much more than by the old method.

What I claim as my invention, and desire to secure by Letters Patent, is—

1. A rotating base for carrying, through the medium of operating mechanism, two or more molds into such position that a descending plunger shall form therein articles of glass-ware, substantially as described.

2. The hinged and counterbalanced drop-pan $s$, made substantially as and for the purposes described.

3. In connection with a series of revolving molds a hooked lever $l'$, wheel $o$, with pins $o''$ or their equivalents, arranged substantially as and for the purposes described.

4. In connection with a series of revolving molds a bent lever, $m$, pin $n$, grooves $p$ $p'$, and wheels $o$, having ratchet-teeth $o'$, or their equivalents, arranged substantially as and for the purposes specified.

5. The block $i$, perforated or chambered out in the direction of the axial line of the molds attached thereto, and provided with drop-weights $x$, substantially as described.

In testimony whereof I, the said WILLIAM C. KING, have hereunto set my hand.

WM. C. KING.

Witnesses:
JAMES J. JOHNSTON,
S. R. HOLMES.

(41)